United States Patent Office 3,486,339
Patented Dec. 30, 1969

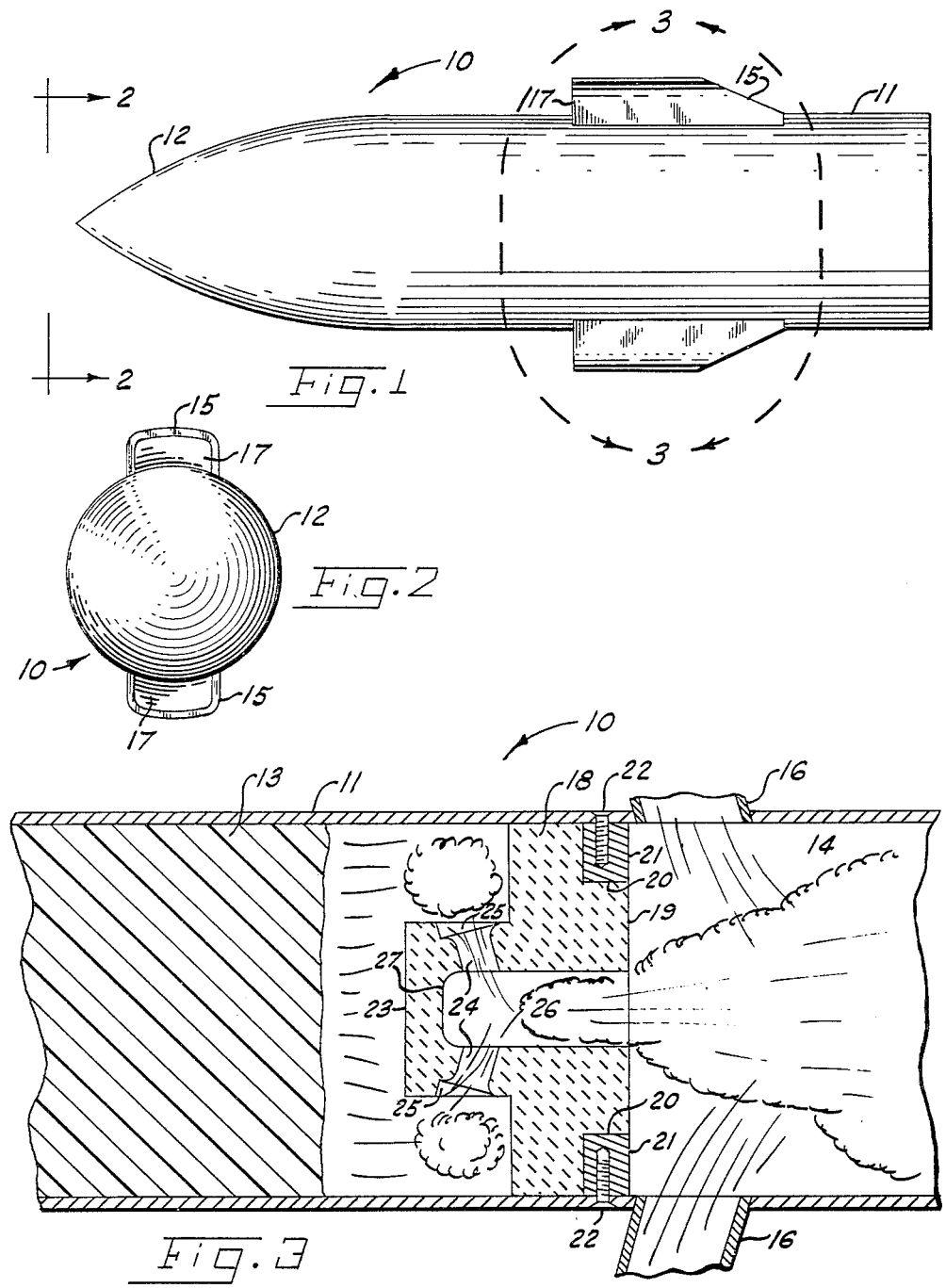

3,486,339
GAS GENERATOR NOZZLE FOR
DUCTED ROCKETS
Thomas F. Owens and George P. Roys, Huntsville, Ala.,
assignors to Thiokol Chemical Corporation, Bristol,
Pa., a corporation of Delaware
Filed Oct. 26, 1967, Ser. No. 678,267
Int. Cl. F02k 3/10
U.S. Cl. 60—261                              4 Claims

ABSTRACT OF THE DISCLOSURE

A gas generator nozzle for ducted rockets that is provided with at least two primary fuel flow passages and one secondary fuel flow passage, the primary fuel flow passages so arranged in angular relation to each other that the fuel streams flowing through the primary fuel flow passages will impinge upon each other to create a turbulent low velocity fuel stream in the secondary fuel flow passage which in turn will exhaust into the afterburner chamber located in the ducted rocket downstream of the gas generator nozzle.

BACKGROUND OF THE INVENTION

Field of the invention

One of the basic problems that is encountered in ducted rocket systems is the obtaining of rapid mixing and complete combustion of the fuel stream from the gas generator motor in the ducted rocket and the air stream that is introduced into the afterburner chamber in the ducted rocket. It has previously been determined that the mixing and combustion of the fuel stream and the air stream are primarily affected by the configuration of the gas generator nozzle.

It is also a well known fact that in order to isolate the performance of the gas generator motor in the ducted rocket, as to flow rate, pressure, etc., from dependency on the flight environment of the ducted rocket, that it is necessary to provide "choked" flow, i.e., flow at sonic velocity at a given location within the nozzle of the fuel streams through the gas generator nozzle.

The instant invention was developed therefore to provide "choked" flow in the gas generator nozzle and concurrently to improve the mixing of the fuel and air streams within the afterburner chamber of the ducted rocket.

Description of the prior art

Many solutions to the aforesaid problem have been tried, such solutions including multiple gas generator nozzles and exotic designs of mixing fingers, etc., in the expansion of the nozzle or in the air streams to create turbulence in the afterburner chamber. Attempts have also been made to combine these solutions into a unitary structure, but no complete solution to the problem had been achieved prior to the development of the instant invention.

Summary of the invention

This invention therefore relates to improvements in gas generator nozzles for ducted rockets that are provided with at least two primary fuel flow passages and one secondary fuel flow passage therein providing for a "choked" flow between the gas generator and afterburner and because of their peculiar angular arrangement to each other will cause an impingement of the primary fuel streams in the secondary flow passage that results in a low velocity fuel stream, that is introduced into the afterburner chamber of a ducted rocket to enhance the mixing and combustion of the fuel stream and the air stream that is also introduced into the afterburner chamber of the ducted rocket.

Knowledgeable evidence has shown that better mixing and combustion of the fuel and air streams will be achieved if the fuel stream is introduced into the afterburner chamber at a low subsonic velocity and such rate of flow is basically achieved by the impingement of the primary fuel streams as they flow through the nozzle.

There have been notable performance increases, in a ducted rocket, using the gas generator nozzle embodying the invention, because it provides a low velocity fuel stream, which action is not available when multiple gas generator nozzles are used, with or without means therein for creating a turbulence in the afterburner chamber of the ducted rocket. It has also been found that much larger increases in performance have been achieved over a conventional single throat nozzle configuration.

The instant invention embodies a structure that is simple and less expensive to manufacture than a ducted rocket equipped with multiple gas generator nozzles or mechanical features that have been used to create turbulence in the afterburner chamber of the ducted rocket.

It is also possible that in the use of multiple nozzles, throat size will become a critical problem and thus eliminate this type of structure from utilization with small scale ducted rocket systems; however, the instant gas generator nozzle can be so arranged that it can be successfully used even with the smallest of the ducted rockets.

It is an object of this invention therefor to provide a gas generator nozzle that causes the fuel flow stream flowing therethrough to be directed through at least two primary flow passages that are so arranged that the fuel streams thus created will impinge upon each other in a secondary fuel flow passage to cause a low velocity fuel stream to be exhausted into the afterburner that creates better mixing of the fuel flow streams with the air entering the afterburner chamber of the ducted rocket to improve the combustion thereof and increase the performance of the ducted rocket.

With the above and other objects and advantages in view that may appear from the following description, the invention will be understood to include but not be limited to, the specific details of construction and arrangement of parts more fully hereinafter described and illustrated in the accompanying drawing, in which:

BRIEF DESCRIPTION OF THE DRAWING

FIGURE 1 is an elevational view of a ducted rocket having a gas generator nozzle embodying the invention incorporated therein.

FIGURE 2 is an elevational view of the forward end of the ducted rocket of FIGURE 1 taken approximately on thel ine 2—2 of FIGURE 1, and FIGURE 3 is an enlarged fragmentary longitudinal sectional view of the ducted rocket covering that area thereof that is encompassed by the dotted line 3—3 of FIGURE 1.

DESCRIPTION OF THE PREFERRED EMBODIMENT

Referring more in detail to the drawing wherein like parts are designated by like reference numerals, the reference numeral 10 is used to generally designate a ducted rocket in which is incorporated a gas generator nozzle embodying the invention.

The ducted rocket 10 is somewhat similar to the ducted rocket covered by Patent 3,173,249 and includes a motor casing 11 having a nose cone 12 on the forward end thereof. The forward portion of the ducted rocket 10 is commonly referred to as the gas generator motor and has positioned therein, a solid propellant charge or grain 13. The aft portion of the ducted rocket 10 is commonly referred to as the afterburner chamber 14 and a plurality of air scoops 15 having air inlets 16 that communicate with the afterburner chamber 14 are mounted on the motor casing 11 at the forward end of the afterburner chamber 14 as shown in FIGURE 3.

The air scoops 15 extend longitudinally of the motor causing 11 and the mouths 17 of the air scoops 15 are directed forwardly toward the nose cone 12 and air entering the air scoops 15 is directed into the afterburner chamber 14 by means of the air inlets 16 as indicated by the flow patterns shown in FIGURE 3.

Mounted in the motor casing 11 just forward of the air inlets 16 and the afterburner chamber 14 is a graphite substantially T-shaped gas generated nozzle 18 and the cross bar 19 of the T-shaped gas generator nozzle 18 has positioned in an annular recess 20 in the aft outer surface thereof a mounting ring 21 whereby the T-shaped gas generator nozzle 18 is rigidly secured to the motor casing 11 by well known fastening means 22. Any movement of the T-shaped gas generator nozzle 18 that could occur would be directed toward the aft end of the motor casing 11, thus the mounting ring 21 and fastening means 22 will prevent any appreciable movement of the T-shaped gas generator nozzle 18, within the motor casing 11.

The stem 23 of the T-shaped gas generator nozzle 18 is provided with at least two fuel passages 24 that are directed toward the center longitudinal axis of the stem 23 at angles of approximately 70 degrees and the outer intake ends of the fuel flow passages 24 assume the shape of enlarged canted circular recesses or cavities 25. The T-shaped gas generator nozzle 18 has a central fuel flow passage 26 therein that extends from and through the aft outer surface thereof, to terminate in a bowl shaped forward end 27 just forward of its communication with the inner ends of the fuel flow passages 24.

In the operation of the ducted rocket 10, gas or fuel is produced by the burning of the solid propellant 13 in the gas generator motor at the forward end of the ducted rocket 10. The solid propellant 13 may be ignited in any well known manner and the gas or fuel will flow through the fuel passages 24 and 26 into the afterburner chamber 14. The T-shaped gas generator nozzle 18 is similar to a conventional standard converging nozzle with no expansion section and thus choked flow occurs in the fuel passage 26 of the T-shaped gas generator nozzle 18. As previously pointed out the fuel flow passages 24 are geometrically positioned so that as shown by the flow pattern in FIGURE 3, the fuel flow from the passages 24 impinge upon each other at angles of approximately 70 degrees in the fuel flow passage 26. The impingement of the fuel flow streams in the passage 26 breaks the fuel flow streams into a fine mist of low velocity particles and a further breakdown of these particles will occur as the fuel flow streams engage the inner surface of the wall of the fuel flow passage 26. At this time the fuel flow streams are at low velocity and will mix with the incoming air entering the afterburner chamber 14 and resulting combustion of the mixed fuel flow and air flow will take place and the ducted rocket 10 will assume its flight pattern.

Having hus described the invention what is claimed as new and desired to be secured by Letters Patent is:

1. In a ducted rocket including a motor casing having a gas generator motor section at the forward end for generating fuel-rich gas, an afterburner chamber at the aft end and air scoops mounted on the motor casing and communicating with said afterburner chamber, to direct an air flow thereto, the improvement comprising a gas generator nozzle mounted in said motor casing intermediate of said gas generator motor section and said afterburner chamber, said gas generator nozzle having at least two primary fuel flow passages positioned therein at angles of approximately 70 degrees to the center axis thereof, a rearwardly directed longitudinally extending secondary fuel flow passage centrally thereof and communicating with said primary fuel flow passages whereby the fuel flows entering said first said fuel flow passages will impinge upon each other within said secondary fuel flow passage and enter and mix with the air flow entering said afterburner chamber through said air scoops to cause combustion of the mixture of fuel and air flows thus created in said after burner chamber.

2. The improvement as in claim 1 wherein the intake ends of said primary fuel flow passages assume the shape of enlarged canted circular recesses and the forward end of said secondary fuel flow passage terminates in a bowl shaped configuration.

3. The improvement as in claim 1 wherein means is provided for rigidly securing said gas generator nozzle in said motor casing.

4. The improvement as in claim 1 wherein said gas generator nozzle is of T-shaped formation and said primary fuel flow passages are in the stem thereof and said secondary fuel flow passage extends through the cross bar thereof into the stem thereof.

References Cited

UNITED STATES PATENTS

| | | | |
|---|---|---|---|
| 3,095,694 | 7/1963 | Walter | 60—261 |
| 3,221,497 | 12/1965 | Forbes | 60—251 |
| 3,350,887 | 11/1967 | Leunig | 60—251 |

CARLTON R. CROYLE, Primary Examiner

DOUGLAS HART, Assistant Examiner